H. F. BUNDOCK & E. T. MAPEL.
Compound for Drain-Tiles.

No. 221,663.  Patented Nov. 18, 1879.

Witnesses
Silas Russell
Joseph Richard Martyr

Inventors,
Henry Frederick Bundock,
and Eliza Thomas Mapel,
per their Attorney
A. G. Waterhouse

UNITED STATES PATENT OFFICE.

HENRY F. BUNDOCK AND ELIGA T. MAPEL, OF SACRAMENTO, CAL.

IMPROVEMENT IN COMPOUNDS FOR DRAIN-TILES.

Specification forming part of Letters Patent No. 221,663, dated November 18, 1879; application filed April 4, 1878.

*To all whom it may concern:*

Be it known that we, HENRY FREDERICK BUNDOCK and ELIGA THOMAS MAPEL, both of the city of Sacramento, State of California, have invented a new and useful Compound for Drain-Tiles, of which the following is a specification.

This invention relates to compounds used in the manufacture of drain tiles and pipes; and it consists in the mixture of one-third portion of lead-slag with iron-slag, as hereinafter more fully set forth.

In carrying out our invention we prepare suitable molds, made of such material as will stand the heat of the slag and can be readily relieved of their contents when cooled off, so that when the slag is being drawn off from the furnace it can be run into said molds' and formed into useful articles, instead of being wasted, as is the custom at present.

In order to more fully illustrate our invention, we present the accompanying drawings, of which the following is a description.

Figure 1 shows a furnace from which the slag is being run into a mold used to form the article. Fig. 2 shows a pipe formed by the mold and composed of slag. Fig. 3 shows another form of mold with a riser attached.

Fig. 1 shows the furnace F, from which the slag is being run, and the mold *m*, into which it is run. Said mold is placed either in an upright or slanting position, so that as the slag is run in at the highest point the dross or lighter material will float to the top, leaving the solid material in the mold, said mold being composed of two parts, *c d*, that clamp together tight, and a core that forms the interior of the article to be formed.

Figure 1:
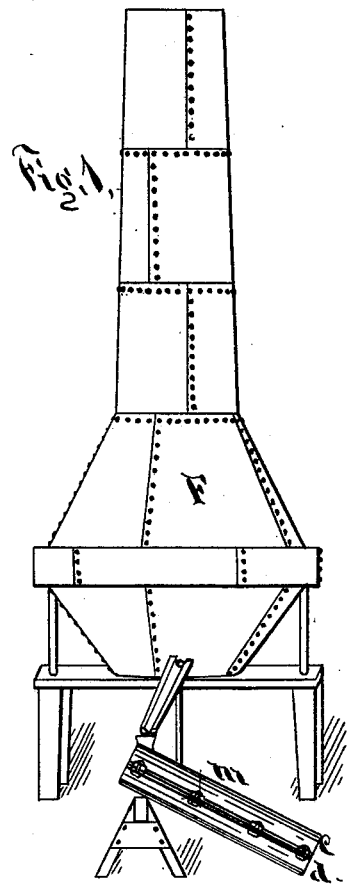
Figure 2:
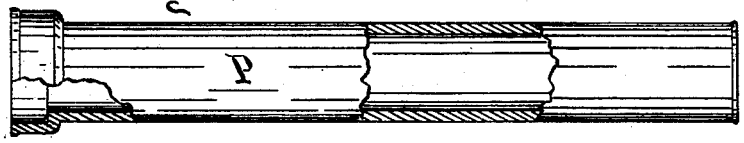
Fig. 2 is a sewer-pipe, P, composed of vitrified slag and formed in the mold.
Figure 3:
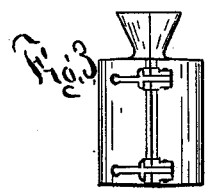
Fig. 3 shows a mold for forming a roofing-tile or any such article, said mold being provided with a riser large enough so that the lighter dross can float to the top, leaving the solid matter at the bottom.

By the above method the slag from reducing-furnaces can be made useful, instead of being thrown away, either by running the slag directly into the molds, or else by letting the slag run into ladles, and from thence into molds.

In fusing refuse slag we find that the slag of iron ore is very refractory in melting and porous after cooling; but by adding one-third of lead-ore slag the latter acts as a flux for the former, and melts at a much lower degree of heat, and also forms a solid vitrified substance that will make a substantial article of ware; also, we prefer to use the slag from a furnace where a part of the ore is that from which lead is produced mixed with the iron ore, or any combination that will have a similar effect in throwing off a solid vitrified slag.

What we claim as our invention, and desire to secure by Letters Patent, is—

The combination, with the fused iron-slag, of a quantity of lead-slag equal to one-third of the quantity of iron-slag, as and for the purpose set forth.

HENRY FREDERICK BUNDOCK.
ELIGA THOMAS MAPEL.

Witnesses:
 SILAS RUSSELL,
 JOSEPH RICHARD MARTYR.